United States Patent
Segal

(10) Patent No.: US 8,955,750 B2
(45) Date of Patent: Feb. 17, 2015

(54) SYSTEM AND METHOD FOR INTERACTIVE MOBILE GAMING

(71) Applicant: Retoy, LLC, New York, NY (US)

(72) Inventor: Edo Segal, New York, NY (US)

(73) Assignee: Retoy, LLC, New York, NY (US)

( * ) Notice: Subject to any disclaimer, the term of this patent is extended or adjusted under 35 U.S.C. 154(b) by 0 days.

(21) Appl. No.: 14/324,940

(22) Filed: Jul. 7, 2014

(65) Prior Publication Data
US 2015/0018095 A1 Jan. 15, 2015

Related U.S. Application Data

(63) Continuation-in-part of application No. 14/060,163, filed on Oct. 22, 2013, now Pat. No. 8,783,557.

(60) Provisional application No. 61/843,151, filed on Jul. 5, 2013, provisional application No. 61/845,804, filed on Jul. 12, 2013, provisional application No. 61/909,890, filed on Nov. 27, 2013.

(51) Int. Cl.
*G06K 7/00* (2006.01)

(52) U.S. Cl.
USPC .......................................................... 235/439

(58) Field of Classification Search
CPC ......... A63F 13/00; G06F 17/30; G06K 19/06; G06K 19/06046
USPC ........... 235/439, 440, 453, 454; 273/288–290
See application file for complete search history.

(56) References Cited

U.S. PATENT DOCUMENTS

| 6,533,634 B1 | 3/2003 | Sugar |
| 6,773,325 B1 | 8/2004 | Mawle et al. |
| 7,862,428 B2 | 1/2011 | Borge |

(Continued)

FOREIGN PATENT DOCUMENTS

WO   WO 01/58553   8/2001

OTHER PUBLICATIONS

Nabor obiektivov dlya IPhone rasshiryaet vozmozhnosti kamery mobilnogo telefona. Fainaidea, No. 27, 2011 [online][retrieved on Feb. 20, 2014]. Retrieved from the Internet: <URL: http://www.fainaidea.com/archives/4903>.

(Continued)

*Primary Examiner* — Seung Lee
(74) *Attorney, Agent, or Firm* — Leason Ellis

(57) ABSTRACT

Disclosed are a method and apparatus for providing isolated actuations in a plurality of animated points of an object. A base portion and an object portion are provided with an apparatus, and a plurality of light receiving elements are configured with the base portion that are operable to detect light emanating from pixels that flash on a computing device display screen. A plurality of actuators are provided with the base portion and each is configured to independently actuate in response to the light detected by the light receiving elements. A plurality of passive mechanical components is provided with the object portion. The mechanical portions are operatively coupled to respective ones of the plurality of actuators, wherein independent movement of respective parts of the object portion is provided by the respective actuators in response to the light detected from the computing device.

20 Claims, 14 Drawing Sheets

(56) References Cited

U.S. PATENT DOCUMENTS

2003/0001016 A1    1/2003    Fraier et al.
2004/0051245 A1    3/2004    Weisman et al.
2008/0153594 A1    6/2008    Zheng
2008/0319252 A1    12/2008    Chapman et al.
2011/0034103 A1    2/2011    Fong et al.

OTHER PUBLICATIONS

Holga iPhone Lens. The iPhoneographer, Mar. 14, 2012 [online][retrieved on Feb. 20, 2014]. Retrieved from the Internet: <URL:http://www.theiphhoneographer.co.uk/2012_03_01_archive.html>.
International Search Report and Written Opinion in corresponding International Application no. PCT1US2013/066166, mailed Mar. 20, 2014.

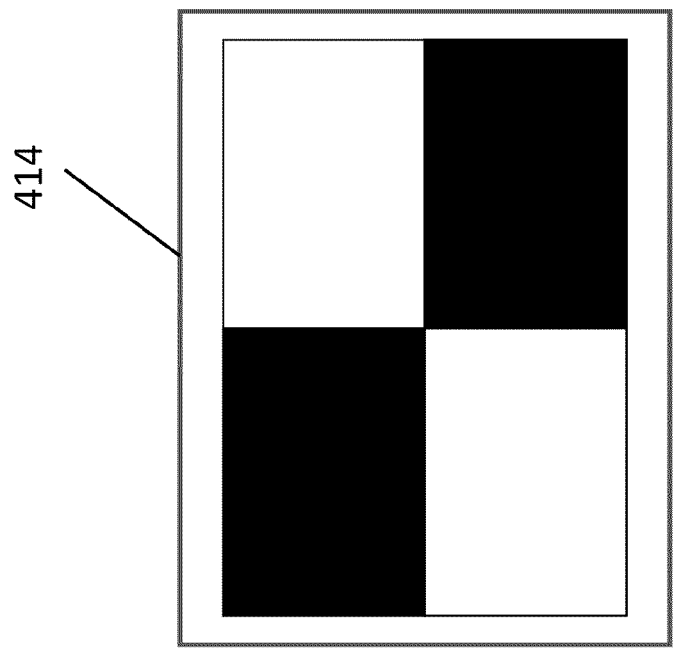
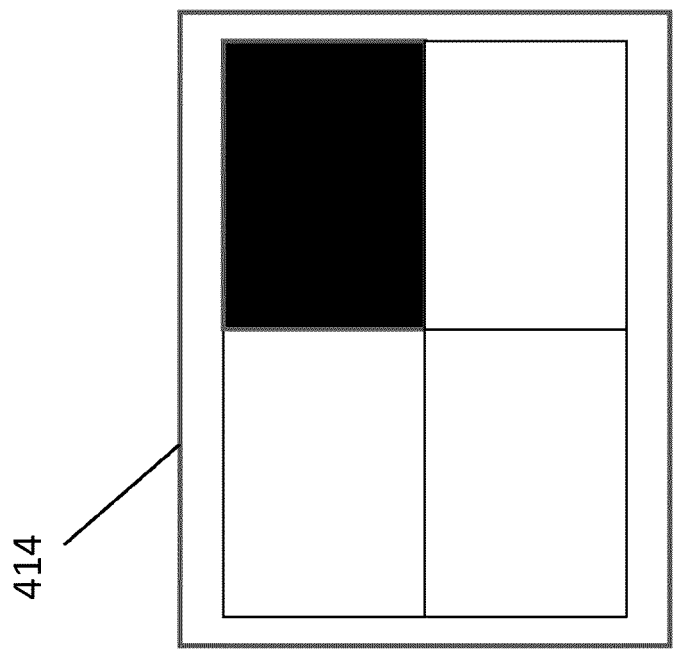
FIG. 6

SYSTEM AND METHOD FOR INTERACTIVE MOBILE GAMING

CROSS-REFERENCE TO RELATED APPLICATIONS

The present application is a continuation-in-part of U.S. Non-Provisional patent application Ser. No. 14/060,163, filed Oct. 22, 2013 and is also based on and claims priority to the following patent applications: U.S. Provisional Patent Application Ser. No. 61/843,151, filed Jul. 5, 2013; U.S. Provisional Patent Application Ser. No. 61/845,804, filed Jul. 12, 2013; and U.S. Provisional Patent Application Ser. No. 61/909,890, filed on Nov. 27, 2013, the contents of all of which are hereby incorporated by reference in their respective entireties.

BACKGROUND

The increasing proliferation of mobile computing devices, such as smartphones, has resulted in users increasingly relying on such devices for recreational purposes, including for game playing. Accordingly, many electronic video games such as multi-player video games have overtaken traditional "physical" games, such as board games, in popularity. While electronic video games may provide many advantages over board games, such video games do not provide the same tangible, 'real world' gameplay experience, as reflected in certain board games through the use of figurines or gameplay pieces.

The present application addresses these and other considerations.

SUMMARY OF THE INVENTION

In accordance with one or more implementations, disclosed are a method and apparatus for providing isolated actuations in a plurality of animated points of an object. A base portion and an object portion are provided with an apparatus, and a plurality of light receiving elements are configured with the base portion that are operable to detect light emanating from pixels that illuminate on a computing device display screen. A plurality of actuators are provided with the base portion and each is configured to independently actuate in response to the light detected by the light receiving elements. A plurality of passive mechanical components is provided with the object portion. The mechanical components are operatively coupled to respective ones of the plurality of actuators, wherein independent movement of respective parts of the object portion is provided by the respective actuators in response to the light detected from the computing device.

These and other aspects, features, and advantages can be appreciated from the accompanying description of certain embodiments of the invention and the accompanying drawing figures and claims.

BRIEF DESCRIPTION OF THE DRAWINGS

FIG. 6 illustrates two example four-bit quadrants associated with a base portion in accordance with an example implementation of the present application;

DETAILED DESCRIPTION OF CERTAIN EMBODIMENTS

Figure 1:
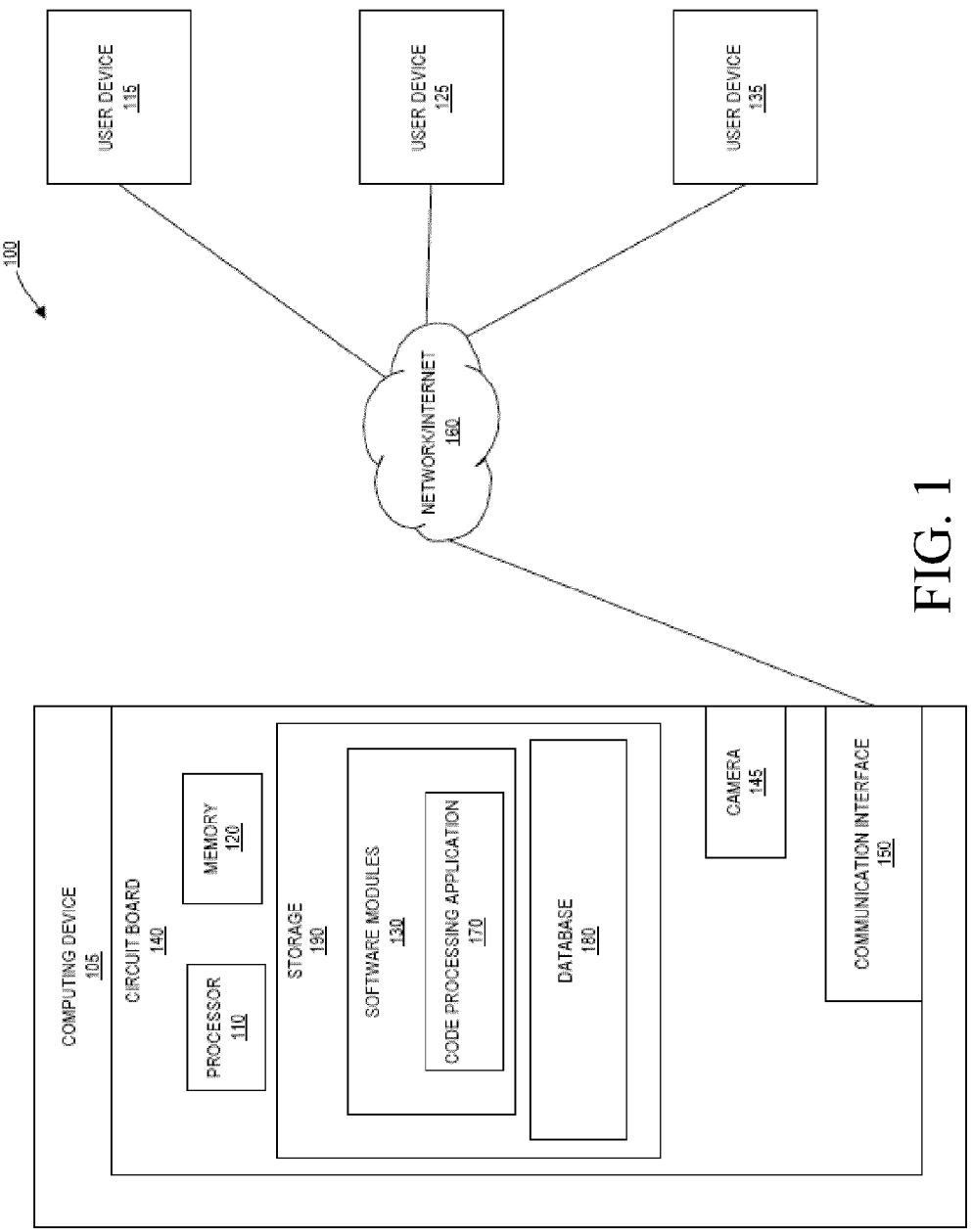
FIG. 1 is a high-level diagram illustrating an exemplary configuration of a processing system in accordance with one or more implementations of the present application.

Various implementations of the present application include an apparatus that includes components that enable an object, such as a figurine, to actuate in one or more independent ways and without the inclusion of a motor, gears or cams. In one or more implementation, light receiving elements detect light emanating from a display screen and effectuate kinetic activity via actuators to move one or more passive components (e.g., mechanical components) provided with the object. The light receiving elements may include, for example, photosensors, photodetectors, photoreceptors, photodiodes or phototransistors, or can include any combination thereof (collectively, "photosensors"). The photosensors can detect light emanating from any light source, including a display screen of a computing device, such as a smartphone, tablet computer, laptop computer, desktop computer or television. The light that emanates from the device is detected via the photosensors and the light is interpreted to instruct the actuators to actuate. In one or more implementations, the light that is detected by the photosensors is provided from the computing device as binary instructions.

In one or more implementations, the apparatus of the present application is configured with a base portion and an object portion. The base portion can include light receiving components, actuators and/or electronic components, and the object can be configured with passive mechanical components that respond to the actuators. In one or more implementations, the object can be configured in the shape of a toy, a figurine, a gamepiece, or other shape. In this and other configurations, the present application facilitates low-cost collectible animatronic toys. In practice, users may obtain a base portion, and collect a plurality of corresponding objects, which can be configured as toys, such as figurines, toy weapons, vehicles or virtually any other shape, and that are usable in conjunction with the base to provide a form of animatronic.

In one or more implementations, electronics can be decoupled from the animatronic, i.e., provided in the base portion, and can include components that enable the base portion to operate autonomously (e.g., without a computing device). Alternatively and in simpler configurations the base is configured to operate in conjunction (e.g., by communicating) with a computing device. Moreover, in various implementations the base and the object may be provided as a single unit. Alternatively, the object can be configured to be detachable from the base.

The passive mechanical components provided with the object portion can include levers and other simple mechanical components, and be configured without active components, such as motors and cam shafts. The actuators provided with the base portion can be powered magnetically, electrically, by solar energy or otherwise, and can effectuate independent and/or isolated kinetic activity of any of one or more of the object's passive components. In this way, kinetic activity is effectuated by the base through the use of a low-cost communication array, which is configured to detect pixels illuminating on a display screen (e.g., flashing on the screen) and translate the light into actuations. Although many of the drawings and examples shown herein relate to pixels, one of ordinary skill in the art will recognize that any discrete light component may be suitable for effectuating kinetic activity, as shown and described herein. Furthermore, the base can include a communications array, including for wireless connectivity such as via radio frequency, infrared, or other suitable protocol. In one or more implementations, breaking a field of infrared light causes the object to "awaken" from a sleep state.

The present application provides small objects (such as toy figures) that are kinetically powered and/or otherwise animated, and that appear to "come to life" through movement, illumination and communication (including response and reaction with) a user. As noted herein, this may be provided for communication with a computing device, such as via data reception using a photosensor array provided on or near the bottom of the base portion. When placed on or near top of the display screen, a high speed communication is effectuated via illuminating (e.g., flashing) of pixels on the screen that are detected by the photosensors and processed to effectuate the object's movement. In addition, the base may be provided with a simple integrated circuit to process the light and/or to cause the actuators to move. Alternatively, the base may include a more complex design, such as including a central processing unit (CPU), speakers, and/or memory to facilitate autonomy, while still maintaining low-cost and preserving collectible objects (e.g., toys and figurines).

In one or more implementations the base may include one or more electronics, such as integrated circuits, memory, audio input/output, and a power source, and may be configured to respond to audio input or the user's touch or pressure. Further, the apparatus can be configured to include operability to respond to user input and provide for corresponding object movement. In one or more implementations, touch sensor inputs (e.g., +/−) using capacitive leads are provided with the object (and/or base) to allow for detection of touch. For example, an object configured with capacitive leads is formed as a toy animal. As the user pets the toy animal, the touches are sensed and the toy responds, for example by closing its eyes. In this way, the present application provides an intriguing interactive platform at a very low cost bill of materials ("BOM").

As noted herein, the base portion of the apparatus can be configured with components enabling the base to be autonomous (e.g., operated independently), and/or can be configured to operate in conjunction with a computing device, such as a smartphone, tablet computer, desktop or laptop computer, television, or other display device. The base portion can be configured to communicate with the computing device to send and/or receive information to and/or from the computing device.

Thus, in one or more implementations, the present application may include a multi-tier platform that facilitates deployment of a new breed of toys. Miniature toys in which small action figure scale toys come to life, such as by moving, talking, communicating and otherwise responding to the user is provided in a new and low-cost platform. The platform can include a low-cost communication array that utilizes pixels, such as displayed on a computing device screen, to communicate with the base via photosensors. The actuators can include a low power bi-directional toggling coil actuator, which requires only a<50 ms pulse and that remains stationary in either direction without drawing significant or even any power. By providing a detachable interface between the actuators and the object portion, many low-cost possibilities are provided. A low cost/low barrier to entry on a BOM, such as for animatronic toys configured in accordance with the teachings herein, eliminates a need for active and expensive components (e.g., motors and cam shafts) by providing kinetic energy generated by a novel actuator-based design, that can include magnetically powered actuators. By providing kinetic energy in a separate base, costs are further reduced, for example, as very low cost objects (e.g., toy figures) can be made, used and sold that interface and animate when operatively coupled with the base.

Furthermore, the apparatus provided in accordance with the present application can include one or more additional ports in the base portion, for example, to provide effects and further autonomy into the object. For example, one or more light pipes can be provided to allow parts of the object to illuminate, such as eyes or weapons. Moreover, in one or more implementations, electrical or other power can be provided to the object to allow for further actuation. In one more implementations, the base and object(s) can be configured to enable the base to identify a respective object (e.g., a particular toy) that is operatively coupled to the base. For example, one or more receptors (e.g., +/−) can be identified using a resistor that is provided in the object. A particular character can be detected by the base as a function of respective resistance parameters detected by the smart base.

Moreover, in operation the base component can be moved around the smart computing device. In one or more implementations, capacitive paint can be used to enable tracking of the base and provide animation, such as via light signaling that tracks the known position of the toy. Moreover, a plurality of apparatuses (e.g., toys) can be placed on the computing device at once time and both may actuate independently. This provides for multiple possibilities, such as providing a dialogue between two toys, or to enable the two toys to otherwise interact (e.g., fight, dance, or the like).

Accordingly, described herein are systems and methods for processing binary instructions from light emanating from pixels on a display screen into actuations of an object. The referenced systems and methods are now described more fully with reference to the accompanying drawings, in which like reference numerals refer to like elements and in which one or more illustrated embodiments and/or arrangements of the systems and methods are shown. The systems and methods are not limited in any way to the illustrated embodiments and/or arrangements, as the illustrated embodiments and/or arrangements described below are merely exemplary of the systems and methods, which can be embodied in various forms. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

An exemplary computer system is shown as a block diagram in FIG. 1 which is a high-level diagram illustrating an exemplary configuration of a processing system 100. Computing device 105 can be a personal computer or server, or can be a mobile computing device, such as a tablet computer, a laptop computer, a smartphone or other suitable computing device. Thus, it is to be understood that computing device 105 of processing system 100 can be practically any computing device and/or data processing apparatus capable of embodying the systems and/or methods described herein.

Computing device 105 of processing system 100 can include a circuit board 140, such as a motherboard, which is operatively connected to various hardware and software components that serve to enable operation of the processing system 100. The circuit board 140 can be operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Internet 160 using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It is to be understood that, in some illustrative embodiments, one or more of software modules 130 can be downloaded over a network to storage 190 from another device or system via communication interface 150 for use within processing system 100. For instance, program code stored in a computer readable storage device in a server can be downloaded over a network from the server to processing system 100.

Moreover, the software modules 130 can include a processing application 170 that is executed by processor 110. During execution of the software modules 130, and specifically the processing application 170, the processor 110 configures the circuit board 140 to perform various operations relating to processing with computing device 105, as will be described in greater detail below.

Furthermore, it is to be understood that while software modules 130 and/or processing application 170 can be embodied in any number of computer executable formats, in certain implementations software modules 130 and/or processing application 170 comprise one or more applications that are configured to be executed at computing device 105 in conjunction with one or more applications or 'apps' executing at remote devices, such as computing device(s) 115, 125, and/or 135 and/or one or more viewers such as internet browsers and/or proprietary applications. Furthermore, in certain implementations, software modules 130 and/or processing application 170 can be configured to execute at the request or selection of a user of one of computing devices 115, 125, and/or 135 (or any other such user having the ability to execute a program in relation to computing device 105, such as a network administrator), while in other implementations computing device 105 can be configured to automatically execute software modules 130 and/or processing application 170, without requiring an affirmative request to execute. It should also be noted that while FIG. 1 depicts memory 120 oriented on circuit board 140, in an alternate arrangement, memory 120 can be operatively connected to the circuit board 140. In addition, it should be noted that other information and/or data relevant to the operation of the present systems and methods (such as database 180) can also be stored on storage 190, as will be discussed in greater detail below.

Continuing with reference to FIG. 1, storage 190 can store database 180. As described in greater detail below, database 180 can contain and/or maintain various data items and elements that are utilized throughout the various operations of processing system 100. Although database 180 is depicted in FIG. 1 as being configured locally to computing device 105, in certain implementations database 180 and/or various of the data elements stored therein can be located remotely (such as on a remote device or server—not shown) and connected to computing device 105 through network 160, in a manner known to those of ordinary skill in the art.

As referenced above, it should be noted that in certain implementations, such as the one depicted in FIG. 1, various ones of the computing devices 115, 125, 135 can be in periodic or ongoing communication with computing device 105 through a computer network, such as the Internet 160. Moreover and in certain other implementations, computing devices 115, 125, and/or 135 can be in periodic or ongoing direct communication with computing device 105, such as through communications interface 150, such as during an interactive multiplayer game (not shown).

Continuing with reference to FIG. 1, communication interface 150 is illustrated as also operatively connected to circuit board 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g., using the 802.11 standard) though it should be understood that communication interface 150 can be practically any interface that enables communication to/from the circuit board 140.

At various points during the operation of processing system 100, computing device 105 can communicate with one or more computing devices, for example, those controlled and/or maintained by one or more individuals and/or entities, such as user devices 115, 125, and/or 135, such as during a multiplayer game. Such computing devices can transmit and/or receive data to/from computing device 105, thereby initiating maintaining, and/or enhancing the operation of the processing system 100. The computing devices 115-135 can be in direct communication with computing device 105, indirect communication with computing device 105, and/or can be communicatively coordinated with computing device 105. While such computing devices can be practically any device capable of communication with computing device 105, in certain embodiments various of the computing devices are servers, while other computing devices are user devices (e.g., personal computers, handheld/portable computers, smartphones, etc.) and, thus, that practically any computing device that is capable of transmitting and/or receiving data to/from computing device 105 can be suitable.

Moreover, while FIG. 1 depicts processing system 100 with respect to computing devices 115, 125, and 135, virtually any number of computing devices can interact with the processing system 100 in a manner described herein. It should be further understood that a substantial number of operations shown and described herein can be initiated by and/or performed in relation to such computing devices. For example, as referenced above, such computing devices can execute applications and/or viewers that request and/or receive data from computing device 105, substantially in the manner described in detail herein.

The present application includes certain embodiments and/or arrangements, and reference to acts and symbolic representations of operations that are performed by one or more devices, such as shown and described in the processing system 100 of FIG. 1. Such acts and operations, which are at times referred to as being computer-executed or computer-implemented, can include manipulation by the processor 110 of electrical signals representing data in a structured form. This manipulation transforms the data and/or maintains them at locations in the memory system of the computer (such as memory 120 and/or storage 190), which can reconfigure and/or otherwise alter the operation of the system in a manner understood by those skilled in the art. The data structures in which data are maintained can be physical locations of the memory that have particular properties defined by the format of the data. Of course, one skilled in the art will recognize that this not meant to provide architectural limitations to the manner in which different embodiments can be implemented. The different illustrative embodiments can be implemented in a system including components in addition to or in place of those illustrated for the processing system 100. Other components shown in FIG. 1 can be varied from the illustrative examples shown. The different embodiments can be implemented using any suitable hardware device or system capable of running program code. In another illustrative example, processing system 100 can take the form of a hardware unit that has circuits that are manufactured or configured for a particular use. This type of hardware can perform operations without requiring program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types. While the various computing devices and machines referenced herein, including but not limited to computing device 105, computing devices 115, 125, and 135, are referred to herein as individual/single devices and/or machines, in certain implementations the referenced devices and machines and their associated and/or accompanying operations, features, and/or functionalities can be arranged or otherwise employed across any number of devices and/or machines, such as over a network connection.

Furthermore and although not all illustrated in FIG. 1, various additional components can be incorporated within and/or employed in conjunction with computing device 105. For example, computing device 105 can include an embedded and/or peripheral image capture device such as a camera 145 and/or an embedded and/or peripheral audio capture device such as a microphone.

The operation of the processing system 100 and the various elements and components described above will be further appreciated with reference to the method for processing as described herein.

Figure 2:
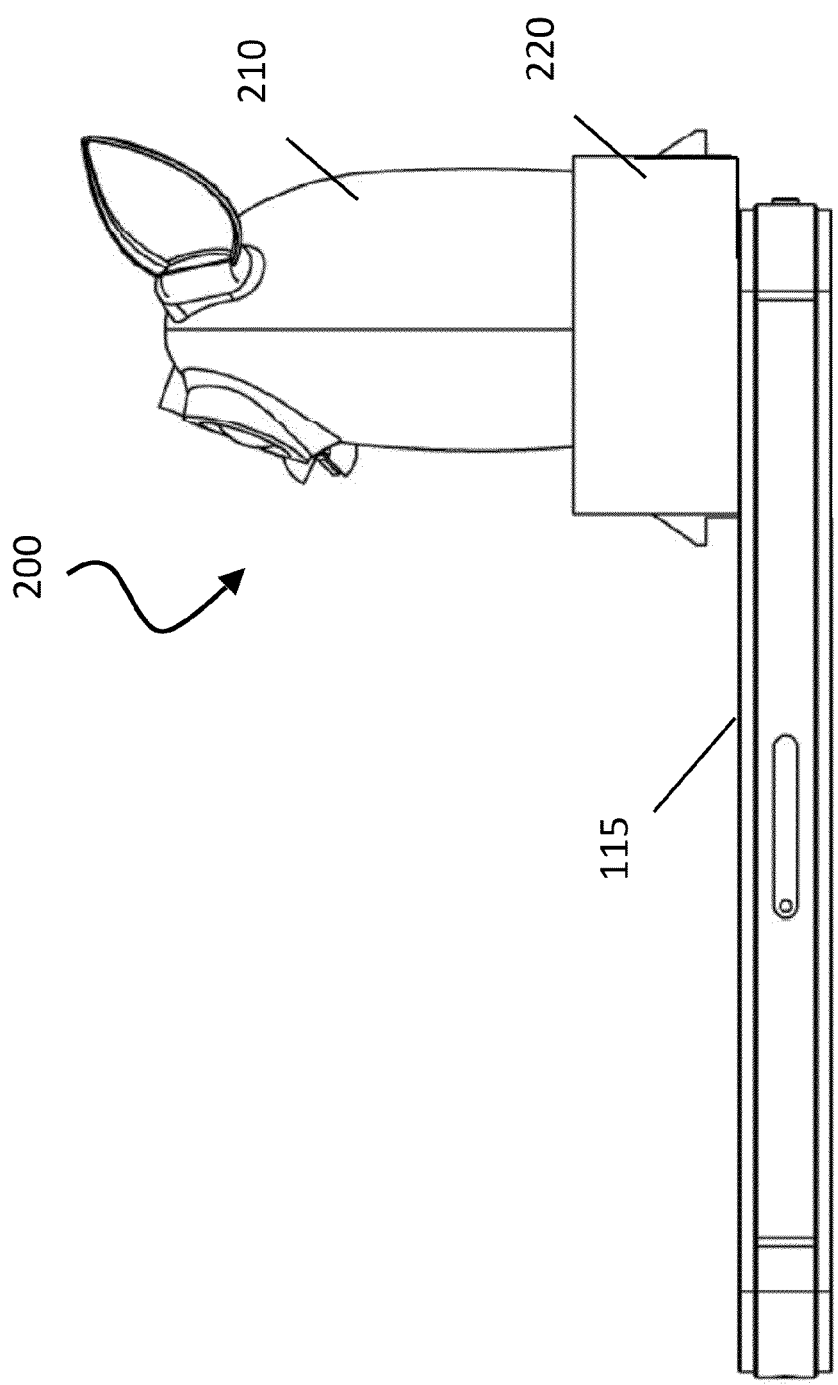
FIG. 2 depicts an example apparatus that is configured as an integrated apparatus, in accordance with an implementation of the present application.

FIG. 2 depicts an example apparatus 200 that is coupled to an example user computing device 115, in accordance with an implementation of the present application. The apparatus 200 shown in FIG. 2 includes an object 210 which, in certain implementations, resembles or otherwise corresponds to a character or role in a game, such as a "real world" game (e.g., a board game) and/or a "virtual" game (e.g., a video game such as a multi-player video game). In the implementation shown in FIG. 2, the object 210 is attachable or otherwise oriented to a base 220. The underside of the base 220 can include a communication array (for example, shown in FIG. 4), which can include a plurality of photosensors that detect light emanating, for example, from a user computing device 115, and interpret binary light commands to effectuate actuations of the object 210.

In certain implementations, apparatus 200 can include and/or be configured to attach or affix to a clip (not shown) or any other such means that can serve to maintain the position of the apparatus 200 at a particular location/orientation with respect to device 115. The communication array receives light from one or more respective pixels displayed on computing device 115, including over the course of a game played on device 115. Alternatively (or in addition), apparatus 200 can be affixed to device 115 using suction, for example, using a suction cup placed on any number of surfaces of the device. Moreover, in certain implementations, a clip (and/or suction cup) while securing the apparatus 200 to a particular location on the surface of a device 115 enables movement, such as rotation, within the particular location to which the gaming piece is secured, such as in the manner shown and described in detail herein.

Although the object 210 illustrated in FIG. 2 appears as a character, virtually any shaped object 210 may be provided and interface with the user. For example, object 210 can be shaped as a race car and respective portions of the car can actuate, illuminate or emit sounds, such wheels, mirrors, doors, seats, lights, horns or the like, and in connection with one or more applications executing on computing device 115. As will be appreciated by one skilled in the art, countless configurations are supported in accordance with the teachings herein.

Figure 3:
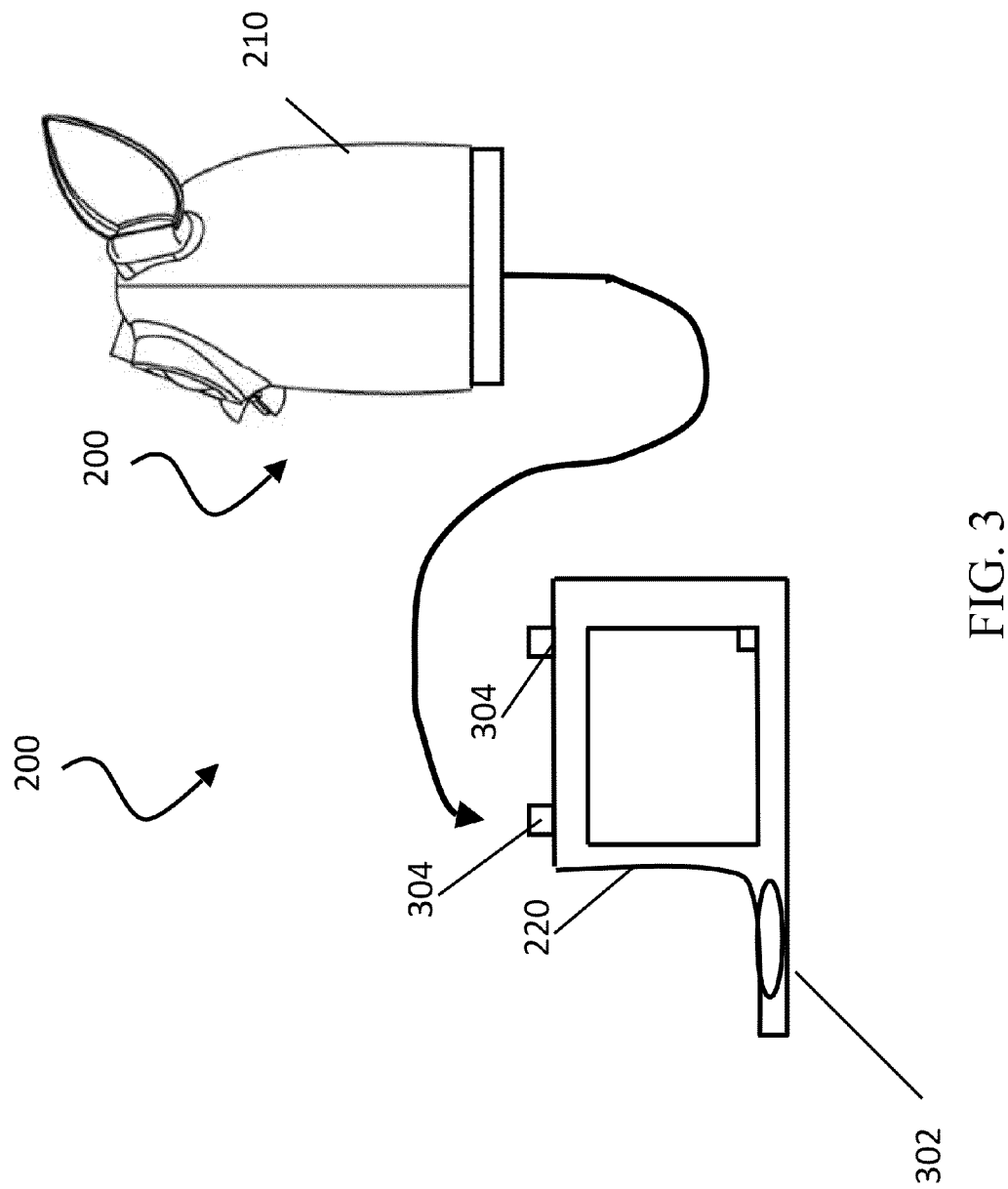
FIG. 3 is an exploded view of an integrated apparatus in accordance with an implementation of the present application.

Referring now to FIG. 3, an exploded view of an apparatus 200 that includes an object 210 and a base 220 is displayed and that is provided in accordance with an implementation of the present application. In the example implementation shown in FIG. 3, the object 210 and base 220 are provided separately: the object 210 is a top portion, which may be configured as a "micro-bot;" and the base 220 includes a communication array and actuators provided therein. Moreover and as illustrated in FIG. 3, a communication array 302 and actuators 304 are configured with base 220. The communication array 302 can include photosensors and/or a simple integrated circuit, and the actuators 304 can include or be electromagnets that are coupleable to object 210, for example, in a compression fit. The actuators 304 may be activated by the communication array 302 in response to binary light commands issued from a computing device 115.

As noted herein, the object 210 can be provided with no motor or power, but with passive mechanical components, such as a series of levers as shown and described herein that can actuate respective animation points of the object 210. When attached to the base 220, the coils actuate respective animation points of the object 210, independently and concurrently. The coils in the base may be controlled by light on the screen of the device (iOs, Android, Windows or devices that run other operating systems). The device transmits binary commands to photo transistors on the base. These commands are read by a low cost IC, which translates the commands to actuate the coils.

Figure 4:
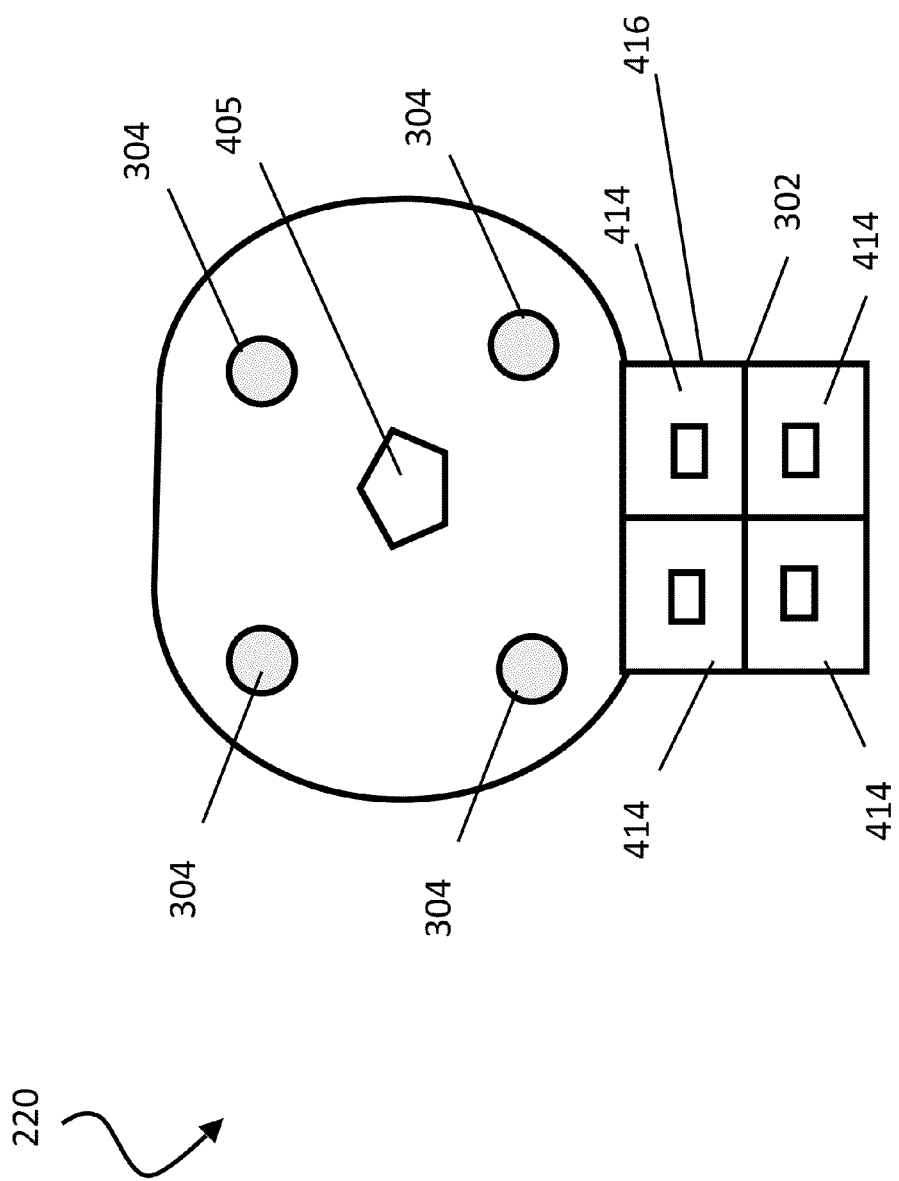
FIG. 4 is a simplified block diagram illustrating the underside of an example base portion of an apparatus in accordance with one or more implementations of the present application.

FIG. 4 is a simplified block diagram illustrating the underside portion of an example base 220, in accordance with one or more implementations. Base 220 may include a hole 405 that is provided in the middle of the top portion and suitable for aligning and/or coupling object 210, for example, to base portion 220. Moreover and as illustrated in FIG. 4, the communication array 302 comprises a plurality of low-cost photosensors 414, that can detect light or dark, and which translate the detections to zeroes and ones to be usable to effectuate movement vis-à-vis actuators 302. Thus, base 220 may couple to object 210, for example, by male/female coupling via hole 405.

Figure 5:
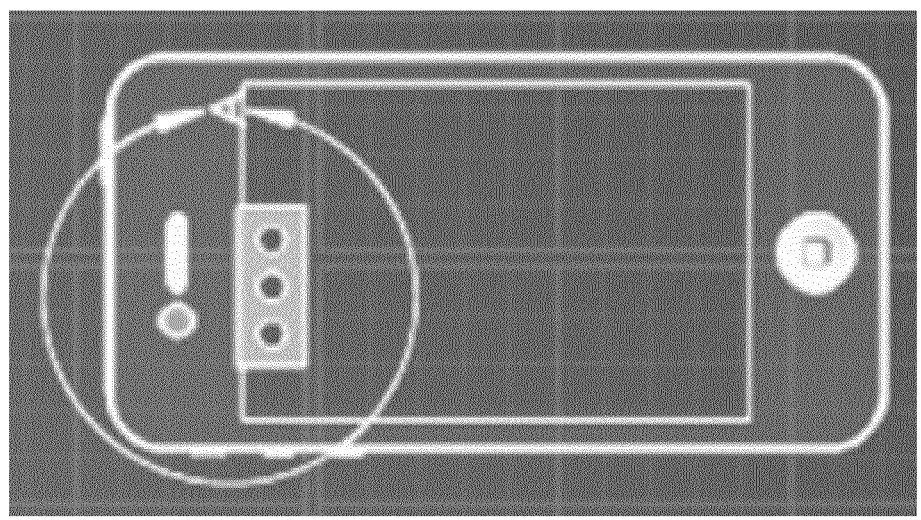
FIG. 5 illustrates an example display screen representing a computing device emanating light from four pixels.

Continuing with reference to the example base portion 220 illustrated in FIG. 4, when positioned on or near a display screen associated with computing device 115, photosensors 414 detect light emanating from the pixels, as well as the absence of light. As shown in FIG. 4, the four photosensors 414 effectively create a quadrant 416. The light and dark regions of a respective quadrant 416 can provide a binary bit controller than is usable to issue commands to control the actuators 406. Depending upon the number of photosensors 414 provided in a respective implementation, a respective number of actuators 406 can be turned on/off. Moreover, by associating one or more actuators 406 with one or more respective photosensors 414, independent and/or isolated actuation of particular parts of the object 210 is supported. An example display screen associated with computing device 115 emanating light from four pixels is illustrated in FIG. 5. Two example four-bit quadrants (e.g., two four bit arrays) associated with base portion 220 are illustrated in FIG. 6.

Figure 7:
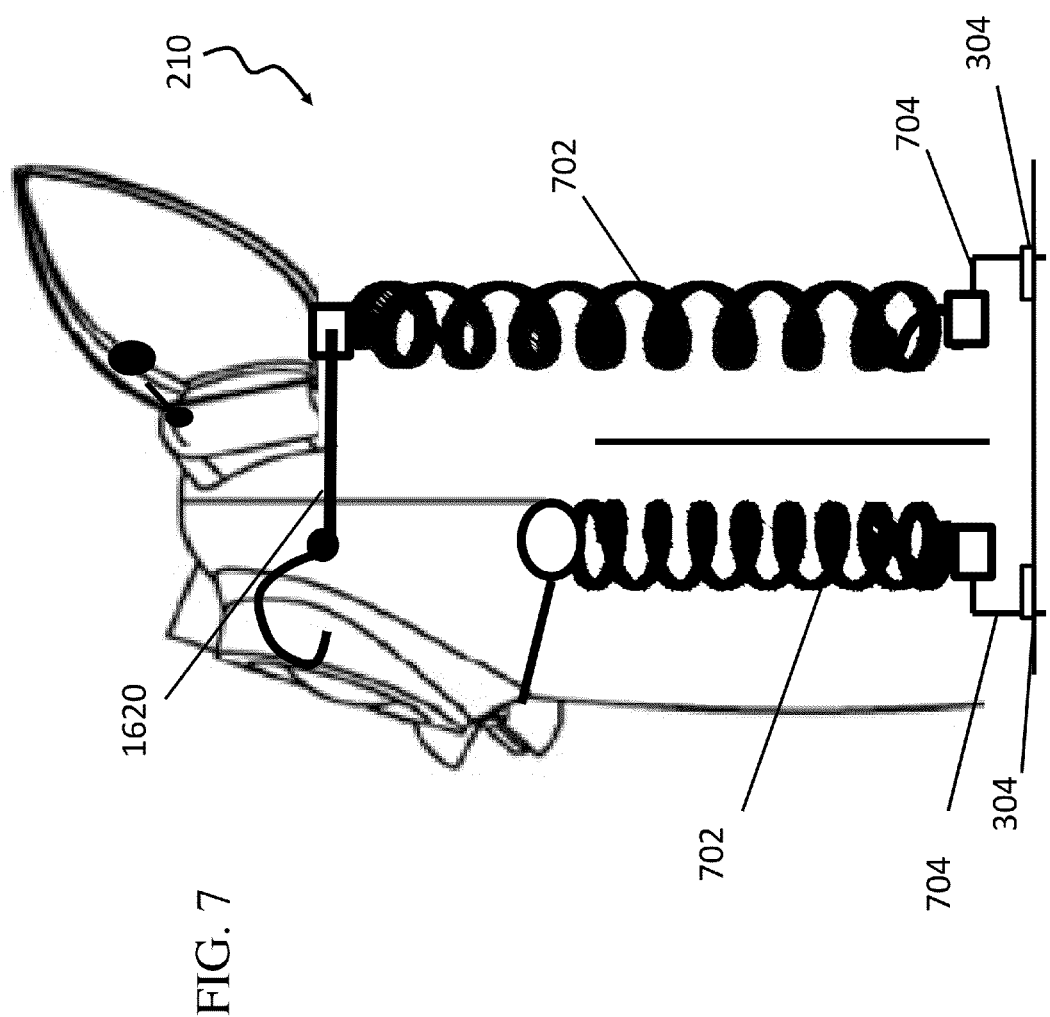
FIG. 7 illustrates an example object that is controllable via light emanating from a display screen.

FIG. 7 is a simplified drawing of an example object 210 that includes actuators 304 that operatively couple to object 210. Actuators 304 can include electromagnets or other components in a various configurations. In the example shown in FIG. 7, object 210 is provided with two weak spring loaded mechanisms 602, which can provide to create a default position, such as eyes being opened or mouth being closed, in an example implementation. When the electromagnetic is charged, it actuates mechanical components 704 that causes a change to the default position, such as eyes closing or a mouth opening. In the example shown in FIG. 7, mechanical components 704 are shown in simplified form as a lever. More detailed views and example configurations of mechanical components 704 are illustrated and described with reference to FIGS. 8-11.

Accordingly, and as shown and described herein, object 210 is configurable to be controlled by software executing on the mobile device 115, which allows the device to puppeteer the object 210, such as to control eyes, nose, ears, mouth, for example up to seven control points in a single four bit controller (e.g., FIG. 4). Object 210 is controllable via light emanating from the display screen as a function of an app or other software program operating on the computing device 115.

Figure 8:
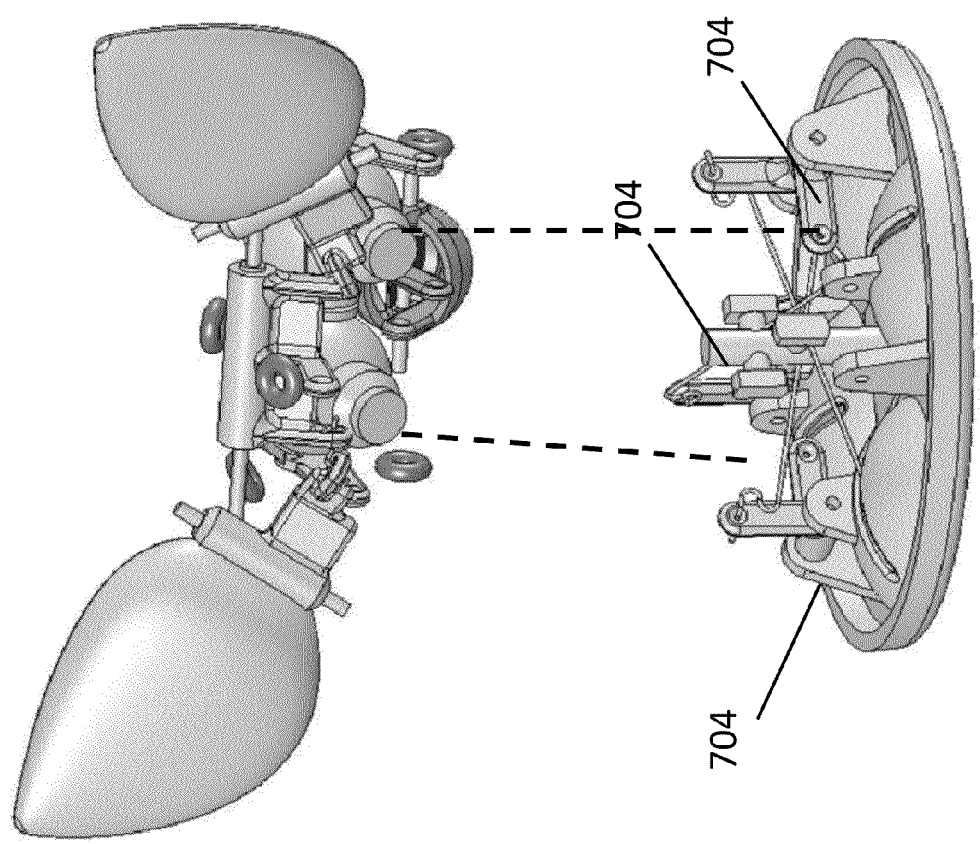
FIG. 8 is a partial exploded view of an alternative implementation of an object and that further illustrates mechanical components configured with the object, in accordance with the present application.

FIG. 8 is a partial exploded view of an alternative example implementation of an object 210 and that further illustrates mechanical components configured with object 210. At least as partially shown in the example implementation of FIG. 8, levers, flywheels, rubber bands, springs and other types of mechanical components, such as linear, rotary and oscillating mechanical components, can be provided that contribute to independent actuation of one or more respective features (e.g., eyes, ears and mouth) of object 210.

Figure 9:
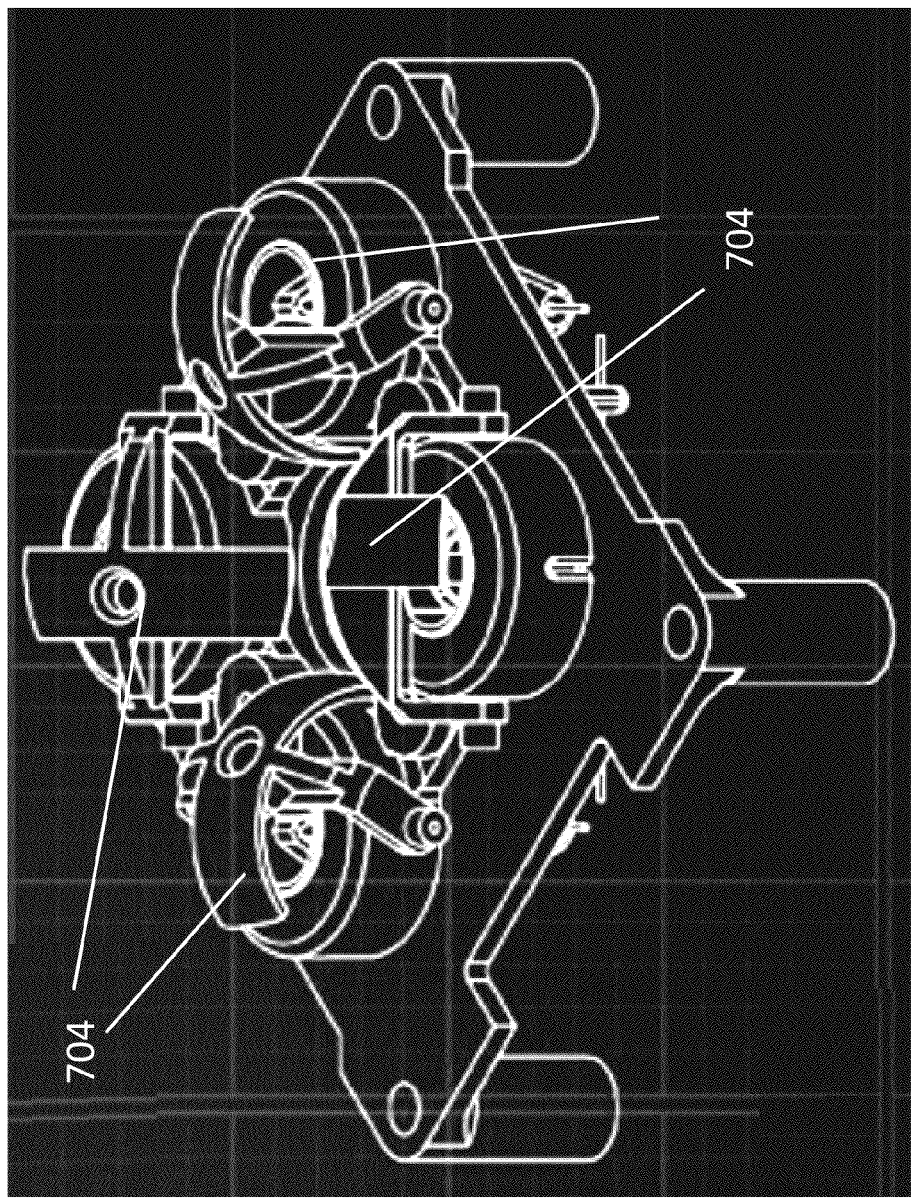
FIG. 9 is a perspective view of a wireframe illustration of example internal mechanical components associated with an example object, in accordance with the present application.
Figure 10:
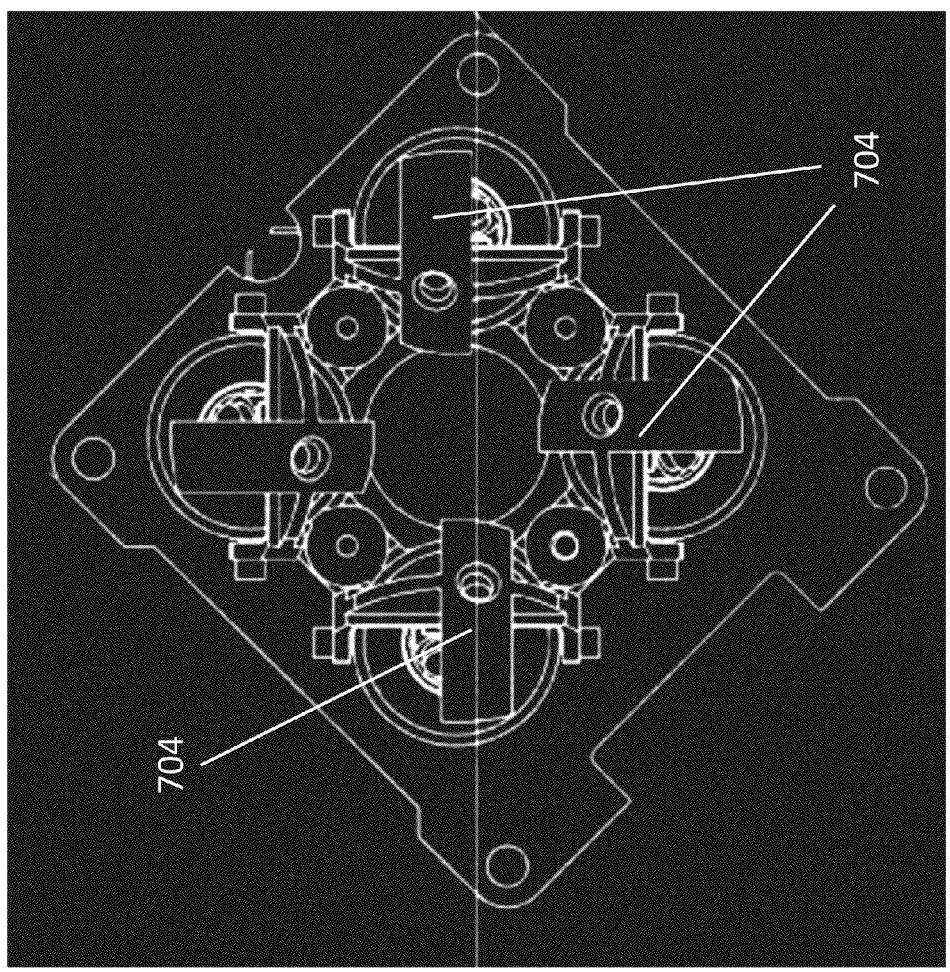
FIG. 10 is a top view of a wireframe illustration of internal mechanical components associated with an example object.
Figure 11:
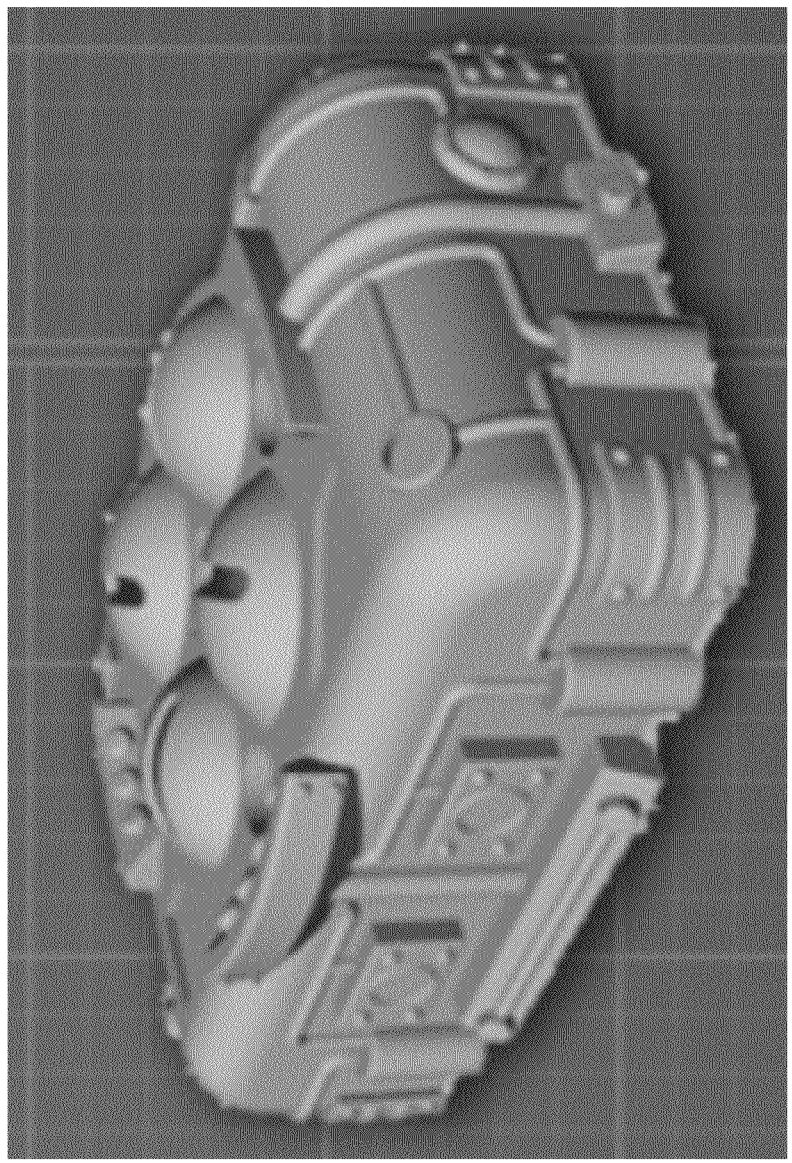
FIG. 11 is an example cover provided for the lower portion of an object, through which at least some of the mechanical components are placed.

FIG. 9 is a perspective view of a wireframe illustration of internal mechanical components associated with an example object 210. FIG. 10 is a top view of a wireframe illustration of internal mechanical components associated with an example object 210. FIG. 11 is an example cover provided for the lower portion of object 210, through which at least some of the mechanical components are placed. In one or more implementations, the object 210 may be coupled to the cover portion of the base 220 to provide functionality shown and described herein.

Figure 12:
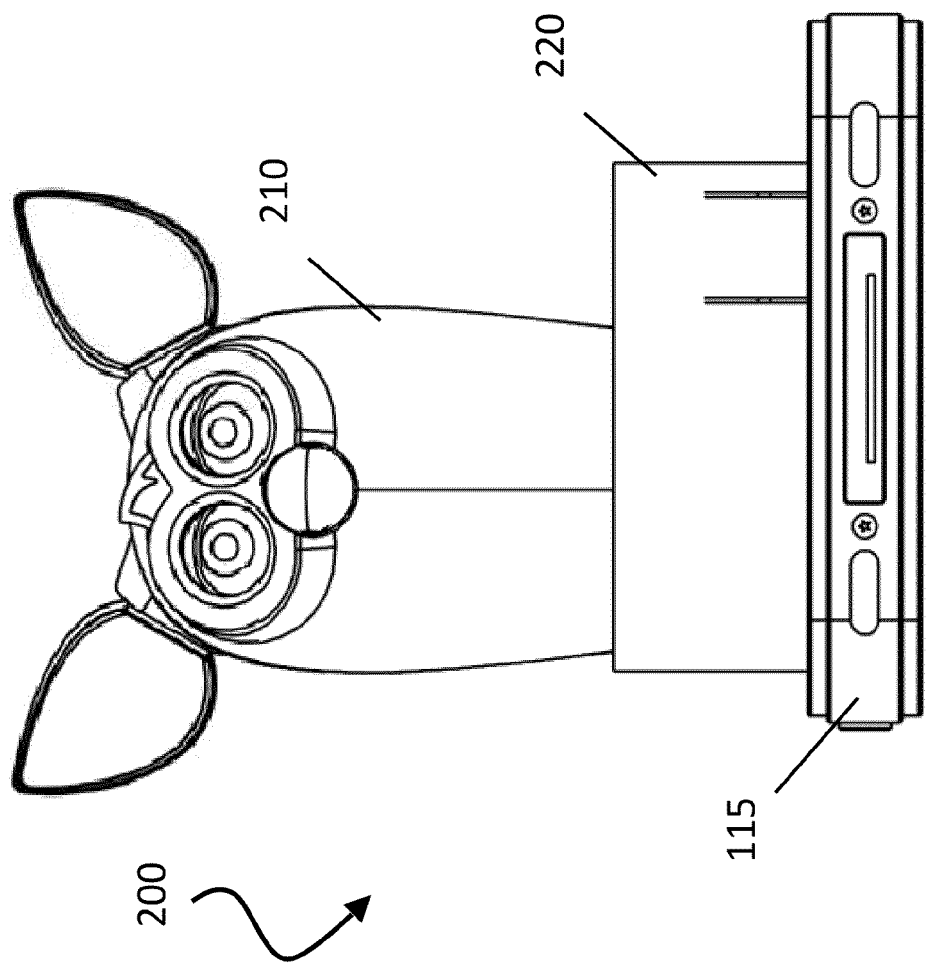
FIGS. 12 and 13 illustrate an example apparatus in two respective states.
Figure 13:
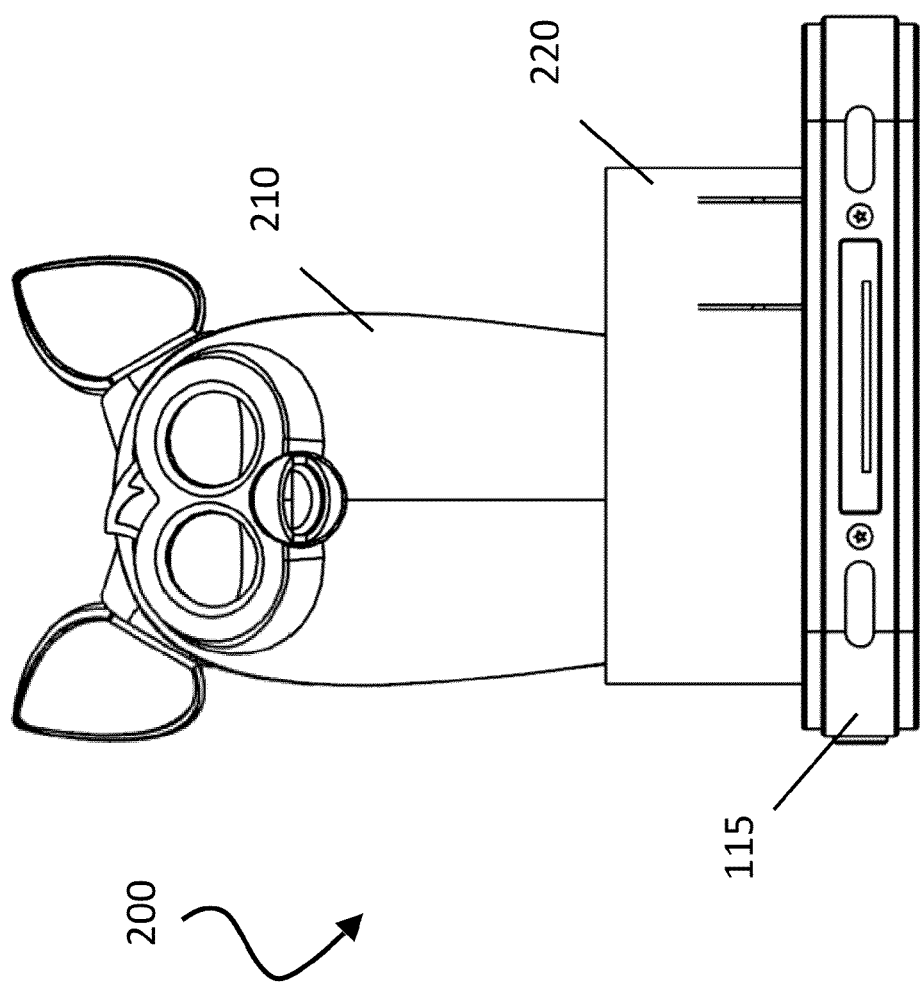

Thus, as shown and described herein, the present application provides a platform that can transform virtually any small toy into a life-like animatronic (almost sentient) being. The characteristics of each species and vectors may include, for example, speed, memory, size and social behavior. At least some of such functionality can provided via an app or other software program operating on the computing device 115. FIGS. 12 and 13 illustrate an example apparatus 200 in two respective states. In FIG. 12, the object 210 is illustrated with ears forward, eyes open and mouth closed. In the FIG. 13, the object 210 is illustrated with ears back, eyes closed and mouth open. By detecting and interpreting binary light commands emanating from the display screen provided with computing device 115, the apparatus 200 causes the respective parts of the object 210 to move in accordance with the respective states.

In one or more implementations, the present application includes an autonomous toy that has logic, memory and speaker in a compact base. Alternatively, the present application may include an apparatus that is operative with a computing device and that may include base that merely communicates commands from the smart device and puppeteers the figure. Alternatively, a hybrid of both may be provided. Notwithstanding the particular implementation, the result is a low-cost synchronous, independently controlled, bi-directional, miniature, animation platform that allows for multiple point animation to occur simultaneously, without the need for motors, gears or cams. For example, a low-cost character is provided with animated eyes, mouth, and ears that operate and can be controlled independently. This provides a solution that avoids a need for multiple motors or a system of cams for multiple animations and to operate in a non-linear or fully independent way. The present application reduces significant costs that would otherwise be incurred using multiple motors that require significant battery power as well as additional gears and positioning sensors to operate.

Figure 14:
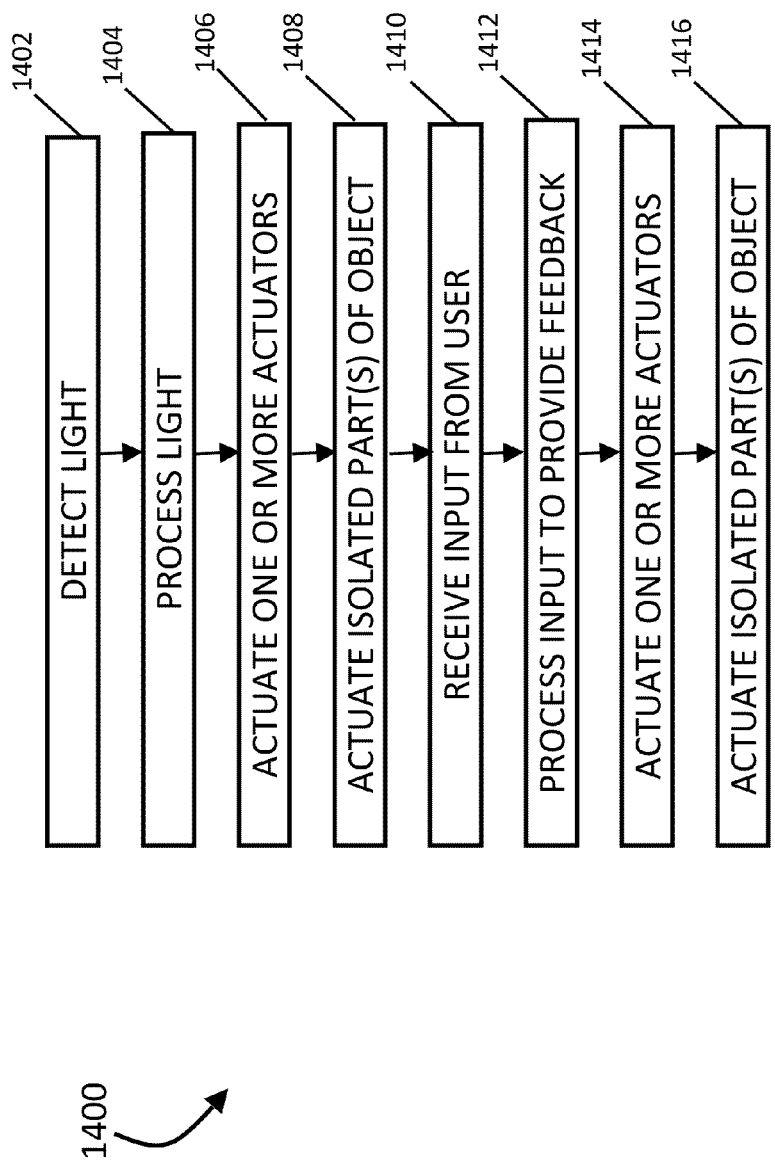
FIG. 14 is a flow diagram showing a routine that illustrates a broad aspect of a method for processing code(s) in accordance with at least one implementation disclosed herein.

Turning now to FIG. 14, a flow diagram is described showing a routine 1400 that illustrates a broad aspect of a method in accordance with at least one embodiment disclosed herein.

Several of the logical operations described herein are implemented (1) as a sequence of computer implemented acts or program modules and/or (2) as interconnected machine logic circuits or circuit modules. The implementation is a matter of choice dependent on the requirements of the device (e.g., size, energy, consumption, performance, etc.). Accordingly, the logical operations described herein are referred to variously as operations, steps, structural devices, acts, or modules. Various of these operations, steps, structural devices, acts and modules can be implemented in software, in firmware, in special purpose digital logic, and any combination thereof. Furthermore, more or fewer operations can be performed than shown in the figures and described herein. These operations can also be performed in a different order than those described herein.

Continuing with reference to FIG. 14, at 1402 light flashing on computing device 115 is detected by apparatus 200, for example, via photosensors. The light that is detected by the photosensors is processed, for example, as a function of determining the status a four-bit quadrant (step 1404). Thereafter, instructions are sent to actuate one or more actuators provided in base portion 220 (1406). The actuations are used to move one or more isolated parts of an object 210 that is operatively (and/or physically) coupled to base portion 220 (1408). At step 1410, input is received from a user. For example, a user may touch (e.g., pet) the object 210, which is received by capacitive leads configured with the object 210. Thereafter, the input is processed to provide feedback, for example to computing device 115 (step 1412). The computing device responds by flashing one or more pixels that is detected by the communication array set forth in base portion 220 and processed to actuate one or more actuators (1416). Thereafter, one or more isolated parts of the object 210 actuate in response to the input from the user (1416).

Thus, in one or more implementations of the present application, the integrated piece of the present application is configured as an autonomous toy without dependence on a computer or computing device. For example, a base component can be configured with memory and/or a processor, as well as a low-cost output (e.g., a speaker), and is operable as a platform for low cost animatronic toys. Such a "smart" base can be configured as a stand-alone component, or can be configured with another toy such as play set, such as a dollhouse. The animatronic toy component (which can be collectible) may not have any active components. In one or more implementations, it includes levers and mechanical motions that effectuate the motion when coupled with the smart base. The smart base can use magnetic actuators to effectuate the kinetic movement of levers and/or mechanical motions inside the collectible toy. The base can also have the ability to supply light into the toy, e.g., via "light tubing," and also power to support various other capabilities in implementations in which electronics are configured with the toy component.

In one or implementations, any character may be connected to the base and be controlled by the platform. Accordingly, a user can "puppeteer" an animatronic toy with a smart device and various software applications can be created that create an illusion of a toy being alive. The present application supports creating artificial intelligence interaction, such as between a child and toy, for example via full-on voice recognition and voice synthesis, which opens opportunity, such as to enhance a multitude of existing games.

In addition, in various implementations of the present application, apparatus 200 can incorporate one or more optics (such as lens(es)) and an integrated code, such as a QR code or barcode. Such optics can be oriented such that the integrated code is viewable through the optics, for example, by an imaging device (e.g., a camera) that may operate with and/or be coupled with a computing device. In one or more implementations of the present application an item, such as a figurine, is provided that is included with the integrated or embedded code such as a QR code or barcode, to form an object. The position and/orientation of the game piece can affect how the code is viewed. For example, the lens(es) can distort or magnify a pattern, thereby resulting in different interpretations of the code. A first instruction can be generated when viewed at a first orientation and/or through a lens, and a second instruction can be generated when viewed at a second orientation and/or through a second lens. The first and second instructions can be different. Examples of such implementations are shown and described in co-pending and commonly assigned patent application U.S. Ser. No. 14/060,163, which is incorporated by reference in its entirety as if expressly set forth fully herein.

In one or more implementations, a frame or other suitable structure may be provided as an accessory to base portion 220, which may be configured with one or more QR codes and/or bar codes that provide further functionality, substantially as shown and described in commonly assigned U.S. patent application Ser. No. 14/060,163. Information associated with the codes configured with the frame accessory can be integrated with the machine readable code provide with the object 210, thereby increasing functionality that would be provided as a function of a single code.

Thus, as shown and described herein, an integrated platform is provided that transforms virtually any small object (including toys) into a life-like animatronic (almost sentient) being. The present application includes a low-cost communication array that utilizes pixels on the smart device screen to communicate with a base portion, via photosensors. The platform further includes a proprietary low power bi-directional actuator. Moreover, the present application includes a detachable interface between the actuators and the object that actuates, thereby allowing for the object to be made at extremely low cost. Further, the present application can be implemented in many ways. For example, the application may include an autonomous toy that has logic, memory and speaker in a compact base. Alternatively, the apparatus 200 may merely respond to pixel based binary light commands issued via a computing device. In accordance with the present application, a synchronous and independently controlled, bi-directional, miniature, animation platform is provided that allows for multiple point animation to occur simultaneously without the need for motors, gears or cams. The present application opens an entire world of imagination, including enhancing existing games and toys, It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for processing code(s). The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. An apparatus for providing isolated actuations in a plurality of points of an object, the apparatus comprising:
 a base portion and an object portion;
 a plurality of light receiving elements configured with the base portion and operable to detect light emanating from pixels that illuminate on a computing device display screen;
 a plurality of actuators provided with the base portion and each configured to independently actuate in response to the light detected by the light receiving elements; and
 a plurality of passive mechanical components provided with the object portion, the mechanical components further operatively coupled to respective ones of the plurality of actuators, wherein independent movement of respective parts of the object portion is provided by the respective actuators in response to the light detected from the computing device.

2. The apparatus of claim 1, further comprising an integrated circuit provided with the base portion and configured to translate signals from the light receiving elements to instruct the actuators to actuate.

3. The apparatus of claim 1, wherein the base portion and the object portion are separate and coupleable.

4. The apparatus of claim 1, wherein the base portion further comprises at least one of electronic memory, a microprocessor, and input/output components, wherein the base portion is configured to actuate the actuators independent of receiving light from the computing device display screen.

5. The apparatus of claim 1, wherein the actuators include electromagnets.

6. The apparatus of claim 1, wherein the object portion is configured as a figure, and the respective parts of the object portion include one or more of eyes, mouth, and ear.

7. The apparatus of claim 1, wherein the object portion is further configured with capacitive leads that receive input from a user, and wherein the object portion is further configured transmit signals associated with the input to the base portion for actuating one or more of the actuators in response to the input.

8. The apparatus of claim 1, wherein the base portion is further configured with an interior region disposed within the base portion and providing an illuminable surface, and further comprising:
a machine-readable code supported by the surface; and
a lens disposed between the machine-readable code and a bottomside of the base portion,
the base portion being configured to seat the lens over the camera associated with the computing device;
wherein the machine-readable code presents, for reading by the computing device, particular information in response to:
the lens permitting light to illuminate at least some of the bottomside of the base portion;
the lens being seated over the camera; and
the machine-readable code or the lens being provided in a respective orientation.

9. The apparatus of claim 1, further comprising a suction cup or a clip to couple at least the base portion to the computing device.

10. The apparatus of claim 1, wherein an application executing on the computing device is a game, and the light emanating from the computing device is provided in the context of the game.

11. The apparatus of claim 1, wherein the light emanating from the display screen is provided as binary instructions from the computing device.

12. A method for providing isolated actuations in a plurality of points of an object, the method comprising:
detecting, via a plurality of light receiving elements configured with a base portion coupled to an object portion, light emanating from pixels that illuminate on a computing device display screen;
responding to the light detected by the light receiving elements to cause each of a plurality of actuators provided with the base portion to independently actuate; and
actuating a plurality of passive mechanical components provided with the object portion, the mechanical components further operatively coupled to respective ones of the plurality of actuators, wherein independent movement of respective parts of the object portion is provided by the respective actuators in response to the light detected from the computing device.

13. The method of claim 12, further comprising translating, by an integrated circuit provided with the base portion, signals from the light receiving elements to instruct the actuators to actuate.

14. The method of claim 12, wherein the base portion further comprises at least one of electronic memory, a microprocessor, and input/output components, wherein the base portion is configured to actuate the actuators independent of receiving light from the computing device display screen.

15. The method of claim 12, wherein the actuators include electromagnets.

16. The method of claim 12, wherein the object portion is configured as a figure, and the respective parts of the object portion include one or more of eyes, mouth, and ear.

17. The method of claim 12, wherein the object portion is further configured with capacitive leads that receive input from a user, and wherein the object portion is further configured transmit signals associated with the input to the base portion for actuating one or more of the actuators in response to the input.

18. The method of claim 12, wherein the base portion is further configured with an interior region disposed within the base portion and providing an illuminable surface, and wherein the base portion includes:
a machine-readable code supported by the surface; and
a lens disposed between the machine-readable code and a bottomside of the base portion,
the base portion being configured to seat the lens over the camera associated with the computing device;
and further comprising:
presenting, by the machine-readable code, for reading by the computing device, particular information in response to:
the lens permitting light to illuminate at least some of the bottomside of the base portion;
the lens being seated over the camera; and
the machine-readable code or the lens being provided in a respective orientation.

19. The method of claim 12, wherein an application executing on the computing device is a game, and the light emanating from the computing device is provided in the context of the game.

20. The method of claim 12, wherein the light emanating from the display screen is provided as binary instructions from the computing device.

* * * * *